US006992157B2

(12) United States Patent
Laubry

(10) Patent No.: US 6,992,157 B2
(45) Date of Patent: Jan. 31, 2006

(54) SYNTHETIC POLYISOPRENES AND A PROCESS FOR THEIR PREPARATION

(75) Inventor: Philippe Laubry, Marsat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 20 days.

(21) Appl. No.: 10/437,330

(22) Filed: May 12, 2003

(65) Prior Publication Data

US 2004/0019171 A1   Jan. 29, 2004

Related U.S. Application Data

(63) Continuation of application No. PCT/EP01/12489, filed on Oct. 29, 2001.

(30) Foreign Application Priority Data

Nov. 13, 2000   (FR) ................................... 00 14677

(51) Int. Cl.
C08F 136/08   (2006.01)
(52) U.S. Cl. .................... 526/340.2; 526/153; 526/164
(58) Field of Classification Search ............. 526/340.2, 526/153, 164
See application file for complete search history.

(56) References Cited

U.S. PATENT DOCUMENTS

| 3,114,743 | A | * | 12/1963 | Horne, Jr. .................... 526/159 |
| 3,794,604 | A | | 2/1974 | Throckmorton et al. ..... 252/431 |
| 3,864,278 | A | | 2/1975 | La Heij et al. .............. 252/429 |
| 4,128,708 | A | | 12/1978 | Liakumovich et al. ....... 526/162 |
| 5,096,970 | A | | 3/1992 | Hattori et al. ............... 525/268 |
| 5,859,156 | A | | 1/1999 | Calderon et al. ............. 526/64 |
| 6,130,299 | A | | 10/2000 | Sone et al. .................... 526/89 |
| 6,255,416 | B1 | * | 7/2001 | Sone et al. .................. 526/153 |

FOREIGN PATENT DOCUMENTS

| EP | 0304088 | 2/1989 |
| EP | 0846707 | 6/1998 |
| JP | 6023406 | 0/0000 |

OTHER PUBLICATIONS

Report of the Academy of Sciences of the USSR, vol. 234, No. 5, 1977 (Y.B. Monakov, Y.R. Bieshev, A.A. Berg, S.R. Rafikov.

"Studies on coordination catalyst based on rare-earth compounds in stereospecific polymerization", Proceedings of China—U.S. Bilateral Symposium on Polymer Chemistry and Physics, Sciences Press, pp. 382-398, 1981 (O. Jun, W. Fosong, S. Zhiquan).
Quang Tho Pham, R. Petiaud, H. Waton, M.F. Llauro Darricades, "*Proton and Carbon NMR Spectra of Polymers*", 1991, Penton Press.
Y. Tanaka, Y. Takeuchi, M. Kobayashi, H. Tadokoro, "Characterization of Diene Polymers. I. Infrared and NMR Studies: Nonadditive Behavior of Characteristic Infrared Bands", *Journal of Polymer Science, Part A-2*, 1971, 9(1), 43-57.
T.F. Banigan, A.J. Verbiscar, T.A. Oda, "An infrared spectrophotometric analysis for natural rubber in guayule shrubs", *Rubber Chemistry and Technology*, 1982, 55(2), 407-415.
P. Geladi and B. R. Kowalski "Partial Least-Squares regression: a tutorial", Analytica Chimica Acta, vol. 185, 1-17 (1986).
F. Ciampelli, D. Moreno, M. Cambini, "Some Remarks on the Infrared Analysis of Polyisoprenes", *Makromol. Chem.*, 1963, 61, 250-253.
U.S. Appl. No. 10/435,582, filed May 9, 2003; Laubry, Phillippe, Catalytic system and process for the preparation of elastomers by means of this system.
Hua Jing et al., "*Polymerization of Isoprene with Fullerenes (C60/C70) Supported Neodymium Catalyst System*" Department of Polymer Materials, Quingdao Institute of Chemical Technology, Dec., 1998, No. 6, Qingdao, China.

* cited by examiner

*Primary Examiner*—Fred Teskin
(74) *Attorney, Agent, or Firm*—Buchanan Ingersoll PC

(57) ABSTRACT

The present invention provides synthetic polyisoprenes having a high cis-1,4 linkage content and a process for their preparation. The synthetic polyisoprenes according to the invention have a cis-1,4 linkage content, measured by carbon-13 nuclear magnetic resonance and/or medium-wave infrared radiation analysis, of greater than 99.0%. The process for the preparation of these synthetic polyisoprenes involve polymerizing, at a temperature of 0° C. or lower, isoprene in the presence of a catalytic system based on: a) a conjugated diene monomer, b) an organic phosphoric acid salt of one or more rare earth, c) an alkylaluminium alkylating agent of the formula AlR3 or HAlR2, and d) a halogen donor consisting of an alkylaluminium halide, wherein the salt is suspended in at least one inert, saturated aliphatic or alicyclic hydrocarbon solvent and the alkylating agent:rare earth salt molar ratio ranges from 1 to 5.

16 Claims, No Drawings

SYNTHETIC POLYISOPRENES AND A PROCESS FOR THEIR PREPARATION

The present application is a continuation of PCT/EP01/12489, filed on Oct. 29, 2001, now WO 02/38635 (published in French). The present invention relates to synthetic polyisoprenes having a high cis-1,4 linkage content and a process for their preparation.

BACKGROUND OF THE INVENTION

It is known that polyisoprenes having a high cis-1,4 linkage content may be prepared using catalytic systems based on:
- a rare earth salt in solution in a hydrocarbon solvent,
- an alkylating agent of this salt formed of an alkylaluminium, and
- a halide of an alkylaluminium.

For example, the document "Report of the Academy of Sciences of the U.S.S.R., volume 234, No. 5, 1977 (Y. B. Monakov, Y. R. Bieshev, A. A. Berg, S. R. Rafikov)" shows that isoprene may be polymerized at a temperature of between 20° C. and 50° C. using a catalytic system comprising:
- a bis(2-ethylhexyl)phosphoric acid salt of neodymium or praseodymium, as rare earth salt, in solution in toluene,
- triisobutylaluminium as alkylating agent, in a molar ratio (alkylating agent/rare earth salt) of 20, and
- diethylaluminium chloride as halide of an alkylaluminium.

Mention may also be made of the document "Proceedings of China—U.S. Bilateral Symposium on Polymer Chemistry and Physics, Science Press, pp. 382–398, 1981 (O. Jun, W. Fosong, S. Zhiquan)". This document teaches the use of a bis(2-ethylhexyl)phosphoric acid salt of neodymium, in association with triethylaluminium or triisobutylaluminium, and an alkylaluminium halide of the formula $Al_2(C_2H_5)_3Cl_3$. The polyisoprenes which are obtained by means of such a catalytic system have a cis-1,4 linkage content which varies from 94.2% to 94.7% (see Tables 4 and 6, pp. 386 and 387).

This document also mentions the use of catalytic systems based on:
- rare earth naphthenate, wherein the cis-1,4 linkage content of the obtained polyisoprenes is between 93.6% and 96.0%; and
- rare earth trichloride (catalytic system of formula LnCl3-C2H5OH—Al(C2H5)3), wherein the cis-1,4 linkage content of the obtained polyisoprenes being between 94.1% and 98.0% (this content of 98% being achieved using ytterbium as rare earth, see Table 12 p. 391).

In the majority of cases, the microstructure of the polyisoprene is determined by the technique of medium-wave infrared radiation analysis (abbreviated to MIR) in accordance with the method developed by Ciampelli et al (F. Ciampelli, D. Moreno, M. Cambini, *Makromol. Chem.*, 1963, 61, 250–253). It will be noted that this method, which is based solely on calculations made in the infrared range, does not always provide results of satisfactory accuracy when used in isolation.

U.S. Pat. No. 5,859,156 describes a process for the preparation of polyisoprenes by means of a catalytic system based on titanium tetrachloride, an organoaluminium and an ether. The maximum cis-1,4 linkage content of the polyisoprenes obtained, measured by carbon-13 nuclear magnetic resonance ($^{13}$C-NMR), was 98.0% (see example 2, column 27, the content of trans-1,4 and 3,4 linkages then being 1.0% each).

SUMMARY OF THE INVENTION

The object of the present invention is to provide novel synthetic polyisoprenes and a process for their preparation, said polyisoprenes having a cis-1,4 linkage content which are distinctly greater than those obtained to date.

The present invention is based on the unexpected discovery that a catalytic system of the "preformed" type based on at least:
- a conjugated diene monomer,
- an organic phosphoric acid salt of a rare earth metal (a metal with an atomic number between 57 and 71 in Mendeleev's periodic table), said salt being in suspension in at least one inert, saturated aliphatic or alicyclic hydrocarbon solvent,
- an alkylating agent consisting of an alkylaluminium of formula $AlR_3$ or $HAlR_2$, and
- a halogen donor consisting of an alkylaluminium halide, wherein the alkylating agent:rare earth salt molar ratio varies from 1 to 5, makes it possible to polymerize isoprene with satisfactory activity at polymerization temperatures which are less than or equal to 0° C., and to obtain at these low temperatures polyisoprenes having a cis-1,4 linkage content, measured using the technique of carbon-13 nuclear magnetic resonance and/or the technique of medium-wave infrared radiation analysis, of greater than 99.0%.

The phrase "based on" used to define the constituents of the catalytic system is taken to mean the mixture and/or reaction product of these constituents. Also, the phrase "a rare earth metal" is intended to mean "one or more rare earth metals."

This catalytic system according to the invention makes it possible to obtain polyisoprenes having a cis-1,4 linkage content, measured by one or the other of these techniques, of between 99.0% and 99.6%, including 99.6%.

The polymerization operations can be carried out in the presence or absence of an inert hydrocarbon solvent.

Advantageously, at polymerization temperatures of from −55° C. to −20° C., the catalytic system makes it possible to obtain polyisoprenes having a cis-1,4 linkage content, measured by one and/or the other of the aforementioned techniques, of equal to or greater than 99.3%, preferably from 99.3% to 99.6%.

Even more advantageously, at polymerization temperatures of from −55° C. to −40° C., the catalytic system makes it possible to obtain polyisoprenes having a cis-1,4 linkage content, measured by one and/or the other of the aforementioned techniques, are equal to or greater than 99.5%, preferably equal to 99.6%.

It will be noted that the cis-1,4 linkage content values, which are very close to the value of 100%, that characterizes natural rubber, have never really been achieved to date. The range of cis-1,4 linkage content, measured in accordance with the present invention takes into account measurements established by means of either medium-wave infrared radiation analysis after calibration of the polyisoprene sample, which is effected within the scope of $^{13}$C-NMR analysis, or $^{13}$C-NMR analysis. The measurement obtained by one of these techniques can be confirmed by that of the other (disregarding the inaccuracy of measurement of +/−0.1%, which is inherent in each of these two techniques). The accuracy of these cis-1,4 linkage content values is thus significantly increased, relative to those of the prior art.

In particular, $^{13}$C NMR analysis showed the total absence of 1,2 linkages and trans-1,4 linkages in the polyisoprene prepared according to the invention.

Furthermore, the particularly high cis-1,4 linkage content obtained for the polyisoprenes according to the invention is independent of the quantity of catalytic system used. Moreover, the polyisoprenes thus obtained have a high viscosity.

DETAILED DESCRIPTION OF THE INVENTION

The catalytic systems according to the invention are characterized by an "alkylating agent:rare earth salt" molar ratio of between 1 and 5, which is extremely low compared with the molar ratios equal to or greater than 20 which have heretofore been used to polymerize isoprene.

1,3-butadiene may be mentioned as a preferred conjugated diene monomer used for "preforming" the catalytic system according to the invention.

Other conjugated dienes that may be used are 2-methyl-1,3-butadiene (or isoprene), 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, or any other conjugated diene having between 4 and 8 carbon atoms.

It will be noted that the "monomer:rare earth salt" molar ration may have a value of from 25 to 50.

According to another characteristic of the invention, said rare earth salt consists of a non-hygroscopic powder having a slight tendency to agglomerate at ambient temperature.

According to a preferred embodiment of the invention, the inert hydrocarbon solvent in which said rare earth salt is in suspension is a low molecular weight aliphatic or alicyclic solvent, such as cyclohexane, methylcyclohexane, n-heptane, or a mixture of these solvents.

According to another embodiment of the invention, the solvent used to suspend the rare earth salt is a mixture of a high molecular weight aliphatic solvent comprising a paraffinic oil, for example petrolatum oil, and of low molecular weight, a solvent such as those mentioned above (for example methylcyclohexane).

This suspension is prepared by dispersive grinding of the rare earth salt in this paraffinic oil, so as to obtain a very fine and homogenous suspension of said salt.

According to another characteristic of the invention, said catalytic system comprises the rare earth metal in a concentration equal or substantially equal to 0.02 mol/l.

According to a preferred example of embodiment of the invention, a tris[bis(2-ethylhexyl)phosphate] salt of the rare earth metal or metals is used as salt.

Even more preferably, the rare earth salt is neodymium tris[bis(2-ethylhexyl)phosphate].

Alkylating agents that can be used in the catalytic system according to the invention, include alkylaluminiums such as:
trialkylaluminiums, for example triisobutylaluminium, or
dialkylaluminium hydrides, for example diisobutylaluminium hydride.

It will be noted that the alkylating agent is preferably diisobutylaluminium hydride (hereinafter "DiBAH").

Halogen donors that can be used in the catalytic system according to the invention included alkylaluminium halides, preferably diethylaluminium chloride (hereinafter "DEAC").

The "halogen donor:rare earth salt" molar ratio may have a value of from 2.6 to 3.

According to the invention, the process for the preparation of said catalytic system comprises:

(i) producing a suspension of said rare earth salt in said solvent, (ii) adding said conjugated diene monomer to the suspension, (iii) adding said alkylating agent to the suspension comprising said monomer to obtain an alkylated salt, and (iv) adding said halogen donor to the alkylated salt.

The aforementioned characteristics of the present invention, as well as others, will be better understood on reading the following description of several examples of embodiment of the invention, which are given by way of illustration and not of limitation.

EXAMPLE I

PREPARATION OF CATALYTIC SYSTEMS OF THE INVENTION

1) Synthesis of an Organic Phosphate Salt of Neodymium of the Invention

A plurality of tests were carried out for synthesis of this salt. The same synthesis method, which is described in detail below, was used for each of these tests.

a) Synthesis of an Aqueous Solution of Neodymium $NdCl_3, 6H_2O$ 96 g of $Nd_2O_3$ (sold by RHODIA), which has been determined by complexation analysis to have an Nd content of 85.3% (theoretical value 85.7%), thereby amounting to 0.57 mol of Nd, was weighed out into a "tall" form 600 ml beaker.

80 ml of demineralized water were added. Under a fume hood, 150 ml of 36 wt. % concentrated HCl (d=1.18), namely 1.75 mol of HCl (molar ratio HCl:Nd=1.75: 0.57=3.07), were slowly added at ambient temperature while the mixture was stirred with a magnetic stirrer.

The reaction $Nd_2O_3 + 6\ HCl + 9\ H_2O \rightarrow 2\ NdCl_3, 6H_2O$ is highly exothermic.

Once all the hydrochloric acid has been added, the solution was raised to boiling while being stirred with a magnetic stirrer. The aqueous $NdCl_3$ solution was clear and mauve in color. No insoluble product ($Nd_2O_3$) remained.

This solution was then evaporated until a volume of 130 ml remained in the beaker. The $NdCl_3, 6H_2O$ was highly concentrated (it crystallized at ambient temperature).

The concentrated solution of $NdCl_3$ was then poured into a 10 liter drum containing 4500 ml of demineralized water at ambient temperature, while the mixture was stirred (using a motor with an anchor agitator).

The pH of the solution, measured at 25° C., was close to 4.

1500 ml of technical grade acetone were then added to the solution. No insoluble product remained and the resultant solution was pink in color.

b) Synthesis of an Organic Sodium Phosphate of Formula $[RO]_2P(O)ONa$ (R=2-ethylhexyl)

68 g, or 1.70 mol, of NaOH flakes were dissolved in a 5 liter beaker containing 1500 ml of demineralized water. 554 g of an organic phosphoric acid (bis(2-ethylhexyl)phosphoric acid, listed in the "Aldrich" catalogue under number 23,782-5), namely 1.72 mol of this acid, were dissolved in another 3 liter beaker containing 500 ml of acetone. The molar ratio NaOH:organic phosphoric acid was 1.70:1.72 or 0.99.

At ambient temperature and while stirring the mixture by hand with a glass stirrer, the solution of said organic phosphoric acid was poured into the NaOH solution. The reaction is as follows:

[RO]$_2$P(O)OH+NaOH→[RO]$_2$P(O)ONa+H$_2$O.

The reaction is slightly exothermic and a homogeneous solution of a yellowish color was obtained. The pH of the solution, measured at 25° C., was close to 7.

c) Synthesis of a Phosphated Neodymium Salt of the Formula [[RO]$_2$P(O)O]$_3$Nd At ambient temperature and while the mixture was being vigorously stirred (motor with anchor agitator), the organic Na phosphate salt obtained in paragraph b) above was poured into the aqueous solution of NdCl$_3$,6H$_2$O obtained in paragraph a) above.

A very fine white precipitate formed immediately. Stirring of the resultant mixture was continued for 30 minutes once all the organic Na phosphate had been added (in a molar ratio (RO)$_2$P(O)ONa:NdCl$_3$=1.70:0.57=2.98). The reaction is as follows:

3[RO]$_2$P(O)ONa+NdCl$_3$,6H$_2$O→Nd[OP(O)[OR]$_2$]$_3$+3NaCl+6H$_2$O.

The resultant phosphated neodymium salt was recovered and washed in a centrifuge equipped with a "sock".

The pH of the mother liquors was between 3 and 4 at 25° C. These mother liquors were colorless and clear.

The salt obtained was divided into two samples, then each sample was washed with an acetone/demineralized water mixture, performing the washing cycle described below three times in order to remove all the chlorides.

Each washing cycle was performed in a 10 liter plastic bucket initially containing 2 liters of acetone. Each sample was then homogenized with the acetone using an "Ultra-Turrax" homogenizer for approximately 1 minute in order to obtain a milky solution.

4 liters of demineralized water were then added to the bucket and the resultant mixture was homogenized for 3 minutes using the same homogenizer.

The resultant mixture was centrifuged and the phosphated neodymium salt was recovered in the "sock".

The qualitative analytic test for chlorides was virtually negative for the final washing water (the reaction is as follows:

NaCl+AgNO$_3$(HNO$_3$ medium)→AgCl↓+NaNO$_3$).

The neodymium salt washed in this manner is dried in an oven under a vacuum and with air-flow for approximately 80 hours.

The final yield for each of the synthesis tests performed was between 95% and 98%, depending upon the losses arising during washing. In each case, approximately 600 g of dry phosphated neodymium salt was obtained.

The mass contents of neodymium, determined by complexometry, were between 12.9% and 13.0% (for a theoretical content τ=[144.24/1108.50]×100=13.01%, where 144.24 g/mol=molar mass of the neodymium).

2) Synthesis of "Preformed" Catalytic Systems According to the Invention a) Composition of Catalytic Systems According to the Invention

Each of these systems comprised a phosphated neodymium salt as synthesized in accordance with paragraph 1)above, which is in suspension in an inert low molecular weight hydrocarbon solvent (consisting of cyclohexane, hereinafter to "CH," or methylcyclohexane, hereinafter "MCH").

These catalytic systems were characterized by the following relative molar ratios, relative to the neodymium salt:

Nd salt:butadiene ("Bd"):DiBAH:DEAC=1:50:1.8 to 4:2.6 or 3.

b) Process for Synthesising these Catalytic Systems

First Stage:
In order to obtain these catalytic systems, 15.6 g of the neodymium salt, in powder form, was poured into a 1 liter reactor from which the impurities had been previously removed. This salt was then subjected to nitrogen bubbling from the bottom of the reactor, for a period of 15 min.

Second Stage:
90% (mass fraction) of the solvent mentioned in paragraph a) above was introduced into the reactor containing the neodymium salt.

When the solvent was cyclohexane, the duration of contact with the neodymium salt varied from 2 hours to 4 hours, and the temperature varied from 30° C. to 60° C. When the solvent was methylcyclohexane, the duration of contact with the neodymium salt was 30 min., and the temperature of contact was 30° C.

Third Stage:
Butadiene was then introduced into the reactor (in the salt:butadiene molar ratio of 1:50 mentioned in paragraph a) above), at a temperature of 30° C., for "preforming" each catalytic system.

Fourth Stage:
Diisobutylaluminium hydride (DiBAH) was then introduced into the reactor as alkylating agent for the neodymium salt in a concentration of approximately 1 M, together with a quantity of the solvent mentioned above in the second stage corresponding to a mass fraction of 5% of the entire solvent. The duration of the alkylation was 15 min. and the temperature of the alkylation reaction was 30° C.

Fifth Stage:
Diethylaluminium chloride (DEAC) was then introduced into the reactor as the halogen donor in a concentration of approximately 1 M, together with a quantity of the solvent mentioned above in the second stage corresponding to the remaining mass fraction of 5% of the entire solvent. The temperature of the reaction medium adjusted to 60° C.

Sixth Stage:
The resultant mixture was then "preferred" (or aged) by maintaining this temperature of 60° C. for a period of 2 hours to 4 hours.

Seventh Stage:
In this manner, approximately 700 ml of a solution of catalytic system was obtained. The reactor was emptied and this solution was transferred to a 750 ml "Steinie" bottle, which had been previously washed, dried and subjected to nitrogen bubbling.

Finally the catalytic solution was stored under a nitrogen atmosphere in a freezer, at a temperature of −15° C.

Table I provides a summary of the catalytic systems that were prepared.

TABLE I

| Catalytic systems | Solvation (solvent/duration/T) | Bd/Nd (mol) | Al/Nd (mol) | Alkylation Duration/T | Cl/Nd (mol) | Preforming with DEAC Duration/T |
|---|---|---|---|---|---|---|
| System 1 | CH<br>2 h, 30° C. | 50 | 4 | 15 min./30° C. | 3 | 4 h, 60° C. |
| System 2 | CH<br>4 h, 60° C. | 50 | 3 | 15 min./30° C. | 3 | 2 h, 60° C. |
| System 3 | MCH<br>30 min., 30° C. | 50 | 3 | 15 min./30° C. | 3 | 4 h, 60° C. |
| System 4 | MCH<br>30 min., 30° C. | 50 | 1.8 | 15 min./30° C. | 3 | 2 h, 60° C. |
| System 5 | MCH<br>30 min., 30° C. | 50 | 1.8 | 15 min./30° C. | 2.6 | 2 h, 60° C. |
| System 6 | CH<br>2 h, 60° C. | 50 | 4 | 15 min./30° C. | 3 | 2 h, 60° C. |

EXAMPLE II

POLYMERIZATION OF ISOPRENE BY MEANS OF THE CATALYTIC SYSTEMS OF EXAMPLE I

1) Examples of Polymerization of Isoprene at a Temperature of −15° C. by Means of Catalytic System 1 a) Polymerization Process Used

A 250 ml "Steinie" bottle was used as the polymerization reactor. Each polymerization reaction was carried out either under static conditions in a freezer (bottle placed in a bath of glycol), or dynamically (by subjecting the bottle to agitation in a tank of glycol).

A steam-cracked C5 naphtha fraction was used, with the aim of extracting isoprene having a purity close to 100% therefrom. To this end, conventional laboratory purification was carried out, comprising:

distillation of this C5 fraction over maleic anhydride to eliminate any residual cyclopentadiene, followed by
passing through a column of alumina to eliminate the polar impurities, and
nitrogen bubbling for 20 min., immediately prior to the polymerization reaction.

The mass fraction of isoprene extracted from this C5 fraction was determined to be 99.2% by gas phase chromatography ("GPC").

Each isoprene polymerization reaction (10 g per bottle) was carried out in cyclohexane at −15° C., under an inert nitrogen atmosphere, with a solvent:monomer mass ratio (S:M) of 9.

In the various examples of polymerization, the neodymium catalyst base was varied from 150 $\mu$mol to 500 $\mu$mol per 100 g of monomer (quantity of neodymium expressed in $\mu$Mcm hereafter). The tightness of the bottle was ensured by a "septum/open-top seal" assembly which permitted the injection of the catalytic system by means of a syringe.

At the end of polymerization, while adding 100 ml of additional solvent to fluidify the medium, acetylacetone was added (1 ml of a solution of a concentration of 1M in cyclohexane) to stop the reaction and N-1,3-dimethylbutyl-N'-phenyl-p-phenylenediamine (abbreviated to 6PPD) as a protection agent (in a volume of 2 ml at a concentration of 10 g/l in cyclohexane, or a mass of 0.02 g).

The polyisoprene was extracted from each polymer solution by steam stripping for 30 minutes, in the presence of calcium tamolate (using 2 ml of tamol and 50 ml of CaCl$_2$ at 30 g/l). Then each extracted solution was dried for approximately 18 hours in an oven at 50° C. under a vacuum (at a pressure of 200 mm Hg), under a gentle stream of nitrogen for approximately 72 hours.

b) Results Obtained

The conversion rate of isoprene into polyisoprene as a function of the reaction time was measured to describe the polymerization kinetics.

The inherent viscosity $\eta_{inh}$ at 0.1 g/dl in toluene and the Mooney viscosity ML(1+4) (measured in accordance with ASTM Standard D-1646) characterize the macrostructure of each polyisoprene obtained.

To determine the microstructure of the polyisoprenes, $^{13}$C-NMR (absolute method of great accuracy) and MIR (medium-wave infrared) analyses were used, as specified in "Measurements and Tests" below. These techniques have made it possible to establish, to within an inaccuracy of 0.1%, the cis-1,4 and 3,4 linkage content ($^{13}$C-NMR analysis having demonstrated the absence of trans-1,4 or 1,2 linkages).

The MIR technique provided great accuracy in determining the content of 3,4 units, owing to the fact that it used the samples of polyisoprene having previously been calibrated for the $^{13}$C-NMR analysis.

Table II sets forth the operating conditions followed for each polymerization and the macrostructural and microstructural characteristics of each polyisoprene obtained.

TABLE II

| Tests | Polymerization conditions | | | | Characteristics of the polyisoprenes | | | |
|---|---|---|---|---|---|---|---|---|
| | type of reactor | Quantity of Nd (μMcm) | Reaction time (hours) | Conversion rate (%) | Inherent viscosity (dl/g) | ML(1 + 4) | Content of cis-1,4 by $^{13}$C-NMR | Content of cis-1,4 by MIR |
| A | Static | 500 | 64 | 100 | 4.9 | 79 | 99.2 | 99.1 |
|   |        | 400 | 64 | 100 | 5.3 | 87 | — | — |
| B | Static | 400 | 64 | 100 | 5.2 | 82 | — | — |
|   | stirred | 400 | 64 | 100 | — | 83 | — | — |
| C | Static | 300 | 64 | 100 | 6.0 | 93 | 99.1 | 99.0 |
| D | Static | 200 | 64 | 100 | 7.2 | — | 99.2 | — |
|   |        | 150 | 64 | 100 | 8.5 | — | 99.2 | — |
| E | Static | 150 | 64 | 100 | 8.6 | — | — | — |
|   | stirred | 150 | 64 | 100 | 8.9 | — | — | — |
| F | Static | 150 | 64 | 100 | — | — | — | 99.1 |
|   |        |     | 47 | 98  | 8.0 | — | — | 99.2 |
|   |        |     | 38 | 94  | — | — | — | 99.1 |
|   |        |     | 22 | 60  | 7.4 | — | — | 99.2 |
|   |        |     | 14 | 42  | 6.8 | — | — | 99.2 |

Table II shows that at a polymerization temperature of −15° C., catalytic system 1 according to the invention made it possible to obtain polyisoprenes having a content of cis in a range from 99.0% to 99.2% with satisfactory activity, whatever the quantity of catalytic base used and whatever the conversion rate achieved for a given quantity of catalytic base.

The results also show that stirring had no influence on the macrostructure of the polyisoprenes obtained. Although the reaction rates were relatively low, the activity of catalytic system 1 was not adversely affected and made it possible to achieve 100% conversion, even for final polyisoprenes having a high viscosity.

2) Examples of Polymerization of Isoprene at a Temperature of −25° C. by Means of the Aforementioned Catalytic Systems 2, 3, 4 and 5 a) Polymerization Process Used

A 750 ml "Steinie" bottle was used as the polymerization reactor, and all the polymerization reactions of the isoprene were implemented statically in a freezer at −25° C. (bottle in a bath of glycol).

The quality of the isoprene was as described in paragraph 1) above. The conversion rate was 100% in all cases (for at least 64 hours of reaction time).

Each polymerization was effected as indicated in paragraph 1), except that a plurality of polymerization solvents and solvent:isoprene monomer (S:M) mass ratios were tested, for the tests carried out.

Because of the viscosity of the polyisoprene solutions obtained, solvent was added thereto, before adding the stoppage and protection agents mentioned in paragraph 1).

The polyisoprene was then extracted from each polyisoprene solution thus "fluidified", then each extracted solution was dried, all in the manner described in paragraph 1).

b) Results Obtained

Table III shows the results obtained (refer to paragraph 1) above for the measurement conditions).

TABLE III

| Tests | Polymerization conditions | | | | | Polyisoprenes obtained | | |
|---|---|---|---|---|---|---|---|---|
| | Cat. syst. | Polymerization solvent | Quantity of Nd (μMcm) | Quantity of isoprene (g) | Ratio S/M | ML(1 + 4) | Content of cis-1,4 by $^{13}$C-NMR | Content of cis-1,4 by MIR |
| G | 2 | none | 500 | 50 | 0 | 52 | — | 99.3 |
|   |   |      | 1000 | 50 | 0 | 35 | — | 99.3 |
|   |   | n-pentane | 1000 | 50 | 1 | 30 | 99.4 | 99.4 |
|   |   | cyclopentane | 1000 | 50 | 1 | 40 | — | 99.4 |
|   |   | CH | 1000 | 50 | 1 | 34 | — | 99.3 |
|   |   | MCH | 1000 | 50 | 1 | 39 | — | 99.3 |
| H | 3 | MCH | 1000 | 36 | 9 | 69 | — | 99.4 |
|   |   |     | 700  | 36 | 9 | 79 | — | 99.4 |
| I | 3 | MCH | 700 | 72 | 5 | 80 | — | 99.5 |
| J | 3 | MCH | 700 | 72 | 5 | 79 | — | 99.5 |
| K | 3 | MCH | 700 | 72 | 5 | 81 | — | 99.4 |
| L | 3 | MCH | 700 | 72 | 5 | 84 | — | 99.4 |

TABLE III-continued

| | | Polymerization conditions | | | | Polyisoprenes obtained | |
|---|---|---|---|---|---|---|---|
| Tests | Cat. syst. | Polymerization solvent | Quantity of Nd (μMcm) | Quantity of isoprene (g) | Ratio S/M | ML(1 + 4) | Content of cis-1,4 by $^{13}$C-NMR | Content of cis-1,4 by MIR |
| | 4 | MCH | 700 | 72 | 5 | 89 | — | 99.4 |
| | 5 | MCH | 700 | 72 | 5 | 97 | — | 99.3 |

These results show that, at a temperature kept at −25° C., catalytic systems 2 to 5 according to the invention made it possible to obtain polyisoprenes having cis-1,4 linkage contents which are on average equal to 99.4% with satisfactory activity.

Insofar as the polymerization temperature remained constant, the presence or absence of solvent, the nature of this solvent (aliphatic or alicyclic) and the quantity of solvent had no effect on cis-1,4 linkage content.

As far as the catalytic systems used are concerned, it will be noted that the cis-1,4 linkage content was independent of the molar ratios DiBAH/Nd and DEAC/Nd.

As far as the macrostructure characteristics of the polyisoprenes obtained are concerned (measurements taken by means of the SEC technique, see "Measurements and Tests" below), the polyisoprene obtained for test G (catalytic system 2) with a quantity of Nd of 500 μMcm had:
- a number-average molecular weight Mn of 338,475 g/mol, and
- a polymolecularity index Ip of 2.389.

As for the polyisoprene obtained for test K (catalytic system 3), it had:
- a number-average molecular weight Mn of 423,472 g/mol, and
- a polymolecularity index Ip of 2.483.

3) Examples of Polymerization of Isoprene at a Temperature of −45° C. by Means of Catalytic System 3

These results show that catalytic system 3 according to the invention had a sufficient activity to polymerize isoprene a) Polymerization Process Used The same polymerization conditions as those set forth in paragraph 2) above were used, except that the polymerization temperature was kept at −45° C. (instead of −25° C.).

b) Results Obtained

Table IV shows the results obtained (reference will be made to paragraph 1) above for the measurement conditions).

TABLE IV

| | | Polymerization conditions | | | | | | Polyisoprenes | |
|---|---|---|---|---|---|---|---|---|---|
| Test | Cat. syst. | Quantity of Nd (μMcm) | Quantity of isoprene (g) | solvent | Ratio S/M | Reaction time (h) | Conversion rate (%) | Inherent viscosity (dl/g) | Content of cis-1,4 by MIR (%) |
| M | 3 | 700 | 72 | MCH | 5 | 144 | 14 | 6.3 | 99.6 |
| | | 1500 | 72 | MCH | 5 | 144 | 22 | 5.4 | 99.6 | at a temperature kept at −45° C., despite the reduced reaction rate which it provided at this very low temperature.

It will be noted that the polyisoprenes thus obtained each have a cis-1,4 linkage content of 99.6%, which is an extremely high amount.

4) Examples of Polymerization of Isoprene at a Temperature of 0° C. by Means of Catalytic Systems 5 and 6 a) Polymerization Process Used

The same polymerization conditions as those set forth in paragraph 1) above (250 ml "Steinie" bottle with 10 g isoprene per bottle) were used, except that the polymerization temperature was kept at 0° C. and that the polymerization was implemented with stirring in a tank of glycol.

b) Results Obtained

Table V shows the results obtained (reference will be made to paragraph 1) for the measurement conditions).

TABLE V

| | | | Polymerization conditions | | | Polyisoprenes obtained | | | |
|---|---|---|---|---|---|---|---|---|---|
| Tests | Cat. syst. | Ratio S/M | Quantity of Nd (μMcm) | Reaction time (h) | Conversion rate (%) | Inherent viscosity (dl/g) | ML(1 + 4) | Content of cis-1,4 (%) by $^{13}$C-NMR | Content of cis-1,4 (%) by MIR |
| N | 6 | 9 | 130 | 48 | 100 | — | 97 | 99.1 | — |
| O | 5 | 9 | 300 | 18 | 100 | 7.6 | 97 | — | 99.0 |
| | | | 700 | 18 | 100 | 5.8 | 84 | — | 99.1 |
| P | 5 | 9 | 700 | 0.25 | 15 | — | — | — | — |
| | | | | 1.5 | 50 | — | — | — | — |
| | | | | 2 | 60 | 4.9 | — | — | 99.1 |
| | | | | 18 | 100 | 6.0 | 86 | — | 99.0 |
| Q | 5 | 9 | 700 | 18 | 100 | — | 85 | — | 99.0 |
| | | 7 | 700 | 18 | 100 | — | 86 | — | 99.0 |

These results show that at a temperature of 0° C., catalytic systems 5 and 6 according to the invention made it possible to obtain polyisoprenes having a cis-1,4 linkage content within a range from 99.0% to 99.1% with satisfactory activity.

For a ratio of polymerization solvent:monomer (cyclohexane:isoprene) equal to 9 (namely 10% concentration), it will be noted that the polyisoprenes obtained with catalytic system 5 according to the invention had, after 18 hours (100% conversion), a high, reproducible Mooney viscosity of approximately 85.

As far as the macrostructure characteristics of the polyisoprenes obtained are concerned (measurements taken by means of the SEC technique, see "Measurements and Tests" below), the polyisoprene obtained for test N (catalytic system 6) had:
- a number-average molecular weight Mn of 930,299 g/mol, and
- a polymolecularity index Ip of 2.46

MEASUREMENTS AND TESTS DETERMINATION OF THE MICROSTRUCTURE OF THE POLYISOPRENES

1) By Carbon 13 Nuclear Magnetic Resonance Analysis ($^{13}$C NMR Analysis)

a) Sample Preparation 2 g of polyisoprene were extracted in refluxing acetone for 8 hours. The extracted polyisoprene was then dried at ambient temperature under a vacuum for 24 hours. This dried polyisoprene was then redissolved in chloroform. The polyisoprene solution was filtered and the solvent removed in a rotary evaporator for 4 hours (bath temperature is 40° C.).

For the purposes of the analysis, approximately 600 mg the of polyisoprene prepared in this manner were solubilized in CDCl$_3$ (2 ml) directly in a $^{13}$C NMR tube.

b) Characteristics of the Apparatus

Spectrophotometer sold under the name "BRUKER AM250".
Resonance frequency (SFO)=62.9 MHz.
Pulse program: INVGATE.AU (suppression of "NOE" effect for quantitative analysis of $^{13}$C by NMR).
Pulse duration: 9 μs (90°).
Relaxation time: 10 s.
Cumulative number of scans (NS)=8192.

c) Assignment of Spectrum Peaks

Peaks were identified following:
Quang Tho Pham, R. Petiaud, H. Waton, M. F. Llauro Darricades, *"Proton and NMR Spectra of Polymers"*, 1991, Penton Press.

d) Integration Method

No 1,2-structural units detected.
The ratio between 3,4- and 1,4- contents was determined by means of the ethylenic carbons. The content of trans-1,4 and cis-1,4 linkages in the polyisoprene was calculated from the aliphatic carbons.

2) By Mid-infrared (MIR) Analysis a) Sample Preparation

The polyisoprene as prepared in paragraph 1) above was used for this infrared analysis, while for NMR the sample was extracted with acetone and then dried in an oven.

A polyisoprene solution of exactly 10 g/l in CCl$_4$ was analyzed using a KBr cell with a pathlength of 0.2 mm.

b) Apparatus

Spectrophotometer sold under the name "BRUKER IFS88".
Recording conditions:
 beam opening: maximum;
 resolution: 2 cm$^{-1}$;
 moving mirror speed: 0.639 cm.s$^{-1}$;
 detector: DTGS;
 accumulations: 64 scans;
 purge time: 3 min;
 spectral window: 4000 to 400 cm$^{-1}$;
 transmission spectra recorded;
 reference: CCl$_4$ solvent.
Spectrum Processing:
 transfer to microcomputer;
 processing with "OPUS" software from "BRUKER".

c) Assignment of Spectrum Peaks

Spectral studies and the contents of the following documents made it possible to determine the characteristic bands of the various linkage modes:

Y. Tanaka, Y. Takeuchi, M. Kobayashi, H. Tadokoro, *Journal of Polymer Science, Part A*-2, 1971, 9(1), 43–57.

J. P. Kistel, G. Friedman, B. Kaempf, *Bulletin de la Société Chimique de France*, 1967, no. 12.

F. Asssioma, J. Marchal, *C. R. Acad. Sc. Paris, Ser C*, 1968, 266(22), 1563–6 and *Ser D*, 1968, 266(6), 369–72.

T. F. Banigan, A. J. Verbiscar, T. A. Oda, *Rubber Chemistry and Technology*, 1982, 55(2), 407–15.

The 3–4 conformation exhibited two characteristic bands:

a high intensity band at 880 $cm^{-1}$ corresponding to the out-of-plane deformation vibrations ($\delta$ C—H) of the terminal hydrogens of the vinyl group ($=CH_2$) and a band at 3070 $cm^{-1}$ corresponding to the $\nu$ C—H stretching of this same group ($=CH_2$).

The cis-1,4 conformation had a characteristic band around 3030 $cm^-$. This band corresponds to the $\nu$ C—H stretching vibrations of the $=CH$ group.

The band corresponding to the symmetrical deformation vibrations of the methyl groups ($\delta$ $CH_3$) was a complex band incorporating all three conformations. Absorption corresponding to the $\delta$ $CH_3$ of the trans-1,4 conformation was at its maximum around 1385 $cm^{-1}$; this was a shoulder of the band.

d) Integration Method

The cis-3,4 and 1,4 bands were integrated by the tangential area method.

The 1,4-trans absorption maximum was located on the shoulder of the intense $\delta$ $CH_3$ band. The most suitable method in this case was to measure the height of the band using the tangent of the $\delta$ $CH_3$ band as the baseline.

e) Calibration Curves

Statement of Beer-Lambert law:

$$Do(\nu \text{ or } \delta) = \epsilon(\nu \text{ or } \delta) \, e \, c$$

where:

$Do(\nu \text{ or } \delta)$=optical density of the band $\nu$ or $\delta$;

$\epsilon(\nu \text{ or } \delta)$=molar extinction coefficient of the analyte responsible for the band $\nu$ or $\delta$;

c=molar concentration of the analyte; and e=sample thickness.

Commercial polyisoprenes (sold as "IR305", "NATSYN 2200" and "SKI-3S"), a polyisoprene synthesized in the laboratory (MC78) and natural rubber (NR) were used as standards. Compared at isoconcentration (solutions), the law may thus be written:

$$Dx=KX$$

where:

Dx=integration value of the band corresponding to structural unit X,

X=content of structural unit X in the rubber (determined by $^{13}C$ NMR), and

K=calibration constant.

Calibration curves Dx=f(X) may thus be plotted for each of the structural units.

DETERMINATION OF THE DISTRIBUTION OF MOLECULAR WEIGHTS OF THE ELASTOMERS OBTAINED BY SIZE EXCLUSION CHROMATOGRAPHY (SEC)

a) Measurement Principle

SEC (size exclusion chromatography) makes it possible physically to separate macromolecules by their size in the swollen state in columns filled with a porous stationary phase. The macromolecules are separated by their hydrodynamic volume, the bulkiest being eluted first.

Although not an absolute method, SEC does enable an assessment to be made of the molecular weight distribution of a polymer. On the basis of commercially available standards, the various number-average (Mn) and weight-average (Mw) molecular weights may be determined and the polydispersity index calculated (IP=Mw/Mn).

b) Preparation of the Polymer

The polymer sample was not subjected to any particular treatment prior to analysis, but is simply solubilized in tetrahydrofuran at a concentration of approximately 1 g/l.

c) SEC Analysis

The apparatus used was a "WATERS model 150C" chromatograph. The elution solvent is tetrahydrofuran, the flow rate 0.7 ml/min, the temperature of the system 35° C. and the duration of analysis 90 min. A set of four columns was used in series, the columns having the commercial names "SHODEX KS807", "WATERS type STYRAGEL HMW7" and two "WATERS STYRAGEL MHW6E".

The volume of polymer sample solution injected was 100 $\mu$l. The detector is a "WATERS model RI32X" differential refractometer and the chromatographic data processing software was "WATERS MILLENNIUM" (version 3.00).

I claim:

1. A synthetic polyisoprene, said polyisoprene having a cis-1,4 linkage content which is greater than 99.0%, wherein the cis 1,4 linkage content is measured by carbon-13 nuclear magnetic resonance and/or medium-wave infrared radiation analysis.

2. The synthetic polyisoprene according to claim 1, having a cis 1,4 linkage content which is equal to or greater than 99.3%.

3. The synthetic polyisoprene according to claim 2, having a cis-1,4 linkage content which is equal to or greater than 99.5%.

4. The synthetic polyisoprene according to claim 3, having a cis-1,4 linkage content which is equal to 99.6%.

5. A process for the preparation of a synthetic polyisoprene having a cis 1,4 linkage content which is greater than 99.0%, comprising polymerizing isoprene in the presence of a catalytic system, said catalytic system being based on a) a conjugated diene monomer, b) an organic phosphoric acid salt of a rare earth metal, c) an alkylating agent selected from the group consisting of a trialkylaluminum compound and a dialkylaluminum hydride d) a halogen donor consisting of an alkylaluminum halide, wherein said salt is suspended in at least one inert, saturated aliphatic or alicyclic hydrocarbon solvent and the alkylating agent:rare earth molar ratio ranges from 1 to 5, wherein said polymerization is carried out at a reaction temperature of less than or equal to 0° C., such that the polyisoprene obtained has a cis 1,4 linkage content of greater than 99.0%, measured by carbon-13 nuclear magnetic resonance and/or medium-wave infrared analysis.

6. The process of claim 5 wherein the polymerization is carried out in the presence or absence of an inert hydrocarbon polymerization solvent.

7. The process for the preparation of a synthetic polyisoprene according to claim 5, wherein the polymerization is carried out at a temperature of −55° C. to −20° C., such that the polyisoprene obtained has a cis-1,4 linkage content which is equal to or greater than 99.3%.

8. The process for the preparation of a synthetic polyisoprene according to claim 5, wherein the polymerization is carried out at a temperature of −55° C. to −40°, such that the polyisoprene obtained has a cis-1,4 linkage content which is equal to or greater than 99.5%.

9. The process for the preparation of a synthetic polyisoprene according to claim 5, wherein the rare earth salt of the catalytic system is a rare earth tris[bis(2-ethylhexyl)phosphate].

10. The process for the preparation of a synthetic polyisoprene according to claim 9, wherein the rare earth salt is neodymium tris[bis(2-ethylhexyl)phosphate].

11. The process for the preparation of a synthetic polyisoprene according to claim 5, wherein the catalytic system comprises the rare earth metal in a concentration of about 0.02 mol/l.

12. The process for the preparation of a synthetic polyisoprene according to claim 5, wherein the catalytic system has a halogen donor:salt molar ratio in a range from 2.6 to 3.

13. The process for the preparation of a synthetic polyisoprene according to claim 5, wherein the catalytic system has a conjugated diene monomer:salt molar ratio in a range from 25 to 50.

14. The process for the preparation of a synthetic polyisoprene according to claim 5, wherein the conjugated diene monomer of the catalytic system is butadiene.

15. The process for the preparation of a synthetic polyisoprene according to claim 5, wherein the alkylating agent of the catalytic system is diisobutylaluminum hydride.

16. The process for the preparation of a synthetic polyisoprene according to claim 5, wherein the halogen donor of the catalytic system is diethylaluminum chloride.

* * * * *